United States Patent
Grimaud

(10) Patent No.: US 8,941,645 B2
(45) Date of Patent: Jan. 27, 2015

(54) COMPARING VIRTUAL AND REAL IMAGES IN A SHOPPING EXPERIENCE

(75) Inventor: Jean-Jacques Grimaud, Winchester, MA (US)

(73) Assignee: Dassault Systemes, Velizy Villacoublay (FR)

( * ) Notice: Subject to any disclaimer, the term of this patent is extended or adjusted under 35 U.S.C. 154(b) by 340 days.

(21) Appl. No.: 13/469,277

(22) Filed: May 11, 2012

(65) Prior Publication Data

US 2013/0300729 A1    Nov. 14, 2013

(51) Int. Cl.
*G06T 15/00* (2011.01)

(52) U.S. Cl.
USPC ......................................................... 345/419

(58) Field of Classification Search
CPC ..... G06T 7/2053; G06T 7/001; G06T 7/0032; G06T 7/0046; G06T 7/0012; G06T 7/0026; G06T 11/006; G06T 17/00; G06T 2207/30108; G06K 9/00208; G06K 9/00214; G06K 9/00912; G06K 9/6201; G01C 21/3638; G06F 17/30259; G06F 17/50; G06F 17/5081; G06Q 30/00; G06Q 30/02; G06Q 10/087; Y10S 128/922; Y10S 706/919; Y10S 715/964
USPC ......................................................... 345/419
See application file for complete search history.

(56) References Cited

U.S. PATENT DOCUMENTS

| | | | |
|---|---|---|---|
| 6,426,757 B1 | 7/2002 | Smith et al. | |
| 7,019,742 B2 | 3/2006 | Le Ouay | |
| 7,440,903 B2 | 10/2008 | Riley et al. | |
| 7,493,336 B2 | 2/2009 | Noonan | |
| 7,680,694 B2 | 3/2010 | Glazer et al. | |
| 7,848,967 B2 | 12/2010 | Young | |
| 7,949,568 B2 | 5/2011 | Fano et al. | |
| 7,957,998 B2 | 6/2011 | Riley et al. | |
| 8,009,864 B2 | 8/2011 | Linaker et al. | |
| 8,049,621 B1 | 11/2011 | Egan | |
| 8,069,095 B2 | 11/2011 | Glazer et al. | |
| 2010/0070388 A1 | 3/2010 | Spindler et al. | |
| 2010/0076959 A1* | 3/2010 | Ramani et al. | 707/722 |
| 2010/0171826 A1* | 7/2010 | Hamilton et al. | 348/135 |

* cited by examiner

*Primary Examiner* — Kee M Tung
*Assistant Examiner* — Haixia Du
(74) *Attorney, Agent, or Firm* — Hamilton, Brook, Smith & Reynolds, P.C.

(57) ABSTRACT

In one embodiment, a computer-based method includes receiving image data of a real world layout. The image data reflects the real world layout across three dimensions (e.g., vertical, horizontal, and orthogonal). Each of the three dimensions has an image range with a beginning and an end. The real world layout has inventory of products distributed across the three dimensions. The computer-based method further includes comparing a 3D model of a planned layout of the environment to the received image data. The 3D model represents the planned layout across the three dimensions. The computer-based method further includes determining whether results of the comparison reach a first particular threshold, and if so, then output a pertinent indication, alert, or the like.

32 Claims, 8 Drawing Sheets

COMPARING VIRTUAL AND REAL IMAGES IN A SHOPPING EXPERIENCE

BACKGROUND OF THE INVENTION

A planogram is a visual representation of a store's products, or more specifically a diagram of the placement of retail products on shelves, in aisles, etc. In retail environments, planograms are used to display products in a uniform manner across multiple stores. Manufacturers, retailers, or other high level entities can design and distribute planograms to retailers. Planograms can assist retail planners in promoting certain products for various reasons, such as to cater to high-profit margin products, to more quickly sell products having a high inventory, to honor manufacturer requests, or to satisfy contractual obligations.

Thus the retail sector use of planograms attempts to optimize visual objects of product placement and/or commercial aspects of product placement. Improvement or enhancement in the use of planograms toward these goals is desired.

SUMMARY OF THE INVENTION

Embodiments of the present invention provide improvements over the state of the art.

In one embodiment, a computer-based method includes receiving image data of a real world layout. The image data reflects the real world layout across three dimensions (e.g., vertical, horizontal, and orthogonal). Each of the three dimensions has an image range with a beginning and an end. The real world layout has inventory of products distributed across the three dimensions. The computer-based method further includes comparing a 3D model of a planned layout of the environment to the received image data. The 3D model represents the planned layout across the three dimensions. The computer-based method further includes determining whether results of the comparison reach a first particular threshold, and if so, then outputting a pertinent indication, alert, or the like.

In another embodiment, the computer-based method can include extracting, from the image data, at least one product display grouping. The computer based method further includes associating the extracted at least one product display grouping with at least one representation of the product display grouping in the 3D model of the planned layout. The computer-based method can further include comparing the extracted at least one product display groupings to the at least one representation of the product display grouping. The computer-based method can also include determining whether the results of the comparison meet a second particular threshold. A person of ordinary skill in the art can recognize that in one embodiment, the first particular threshold and second particular threshold may be the same threshold.

The computer-based method can further include generating an alert if the results of the comparison of the 3D model to the received image data reach the first particular threshold. The comparison can represent similarity or non-similarity and the first particular threshold can represent a particular degree of similarity.

In another embodiment, the computer-based method can further include generating the 3D model of the planned layout. Comparing the 3D model to the received image data can include calculating an image difference.

In another embodiment, the computer-based method further includes converting the 3D model to a 2D representation. Comparing the 3D model to the received image data can include comparing the 2D representation of the 3D model to the received image data.

In another embodiment, comparing the 3D model of the planned layout to the received image data further includes converting the image data to a rendered 3D model and comparing the 3D model of the planned layout to the rendered 3D model.

In another embodiment, comparing a 3D model of a planned layout to the image data further includes analyzing the image data to determine a first quantity in an inventory retrieving a second quantity in the inventory, and comparing the first quantity and the second quantity. The first quantity in the inventory can be represented in the real world layout and the second quantity in the inventory can be represented in the 3D model of the planned layout.

In one embodiment, receiving image data further includes capturing image data of products in a customer display location and in a storage location. Retrieving a second quantity in the inventory can also include retrieving the second quantity from a transaction accounting system. Comparing the first quantity and the second quantity can include calculating the difference of the first quantity and the second quantity. The difference can indicate a difference between a quantity of inventory calculated to be in a store and a quantity of inventory actually (visually accounted for through real time imaging) in the store.

In another embodiment, receiving the image data of a real world layout can include capturing the image data of the real world layout with a plurality of cameras. Receiving the image data of the real world layout can include capturing the image data of the real world layout with the plurality of cameras positioned to be able to generate the 3D model of the real world layout.

In another embodiment, the computer-based method includes adjusting the received image data to match properties of the 3D model. The properties of the 3D model include one or more of lighting characteristics, contrast, hue, shadow placement, and shadow removal.

In another embodiment, the method can include generating an instruction to conform the real world layout to the planned layout of the environment.

In another embodiment, the method can include receiving audio data of the real world layout. The audio data can reflect at least one of sounds, voice, or music from the real world layout. The method can further include comparing a sound model of the planned layout of the environment to the received audio data. The sound model represents the planned layout. The method further includes determining whether results of the comparison reach a first particular threshold.

In one embodiment, a system includes a reception module configured to receive image data of a real world layout. The image data reflects the real world layout across three dimensions. Each of the three dimensions has an image range with a beginning and an end. The real world layout has inventory distributed across the three dimensions. A comparison module is configured to compare a 3D model of a planned layout of the real world layout to the received image data. The 3D model represents the planned layout across the three dimensions. A threshold determination module can be configured to (i) determine whether results of the comparison reach a first particular threshold, and (ii) output commensurate indications.

In another embodiment, a computer comprises a memory area configured to store image data reflecting the real world layout across three dimensions. Each of the three dimensions has an image range with a beginning and an end. The real world layout has inventory distributed across the three dimensions and a 3D model of a planned layout. The 3D model representing the planned layout across the three dimensions in said memory area. The computer further comprises a processor coupled to said memory area. The processor is configured to receive the image data of the real world layout, compare the 3D model of the planned layout to the received image data, and determine whether results of the comparison reach a particular threshold.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

In retail environments, it is common for retailers or distributors of products to desire particular products to be placed in certain locations within a store. Retailers can cooperate with the distributors of products to plan how products are displayed in stores. A planogram is a tool to help plan where to place and display products in a store. A planogram is a diagram, map, or a set of instructions to arrange products in a particular manner, in a particular area of a retail environment. For example, on a particular set of shelves, a most expensive product may be placed on a shelf that is closest to eye level where customers are likely to look, and a cheaper product that the retailers and distributors do not want customers to purchase, can be placed on lower or higher shelves, where customers are less likely to look. Another example of use of a planogram is in the arrangement of a mobile display that holds a particular product and that can be positioned in a high-traffic area of the retail environment to emphasize the particular product. Planograms can be used to plan and arrange (or otherwise configure) portable shelves, or constructible shelves, for example, plastic or cardboard ones, and to further emphasize the particular product using the shelving itself.

A manager of a retail environment may have difficulty tracking changes to planograms in his or her store. The designer of the planograms can change the desired product layout or in-store location affected by the planograms in the retail environment on a periodic basis, for example monthly, weekly, or even daily. Therefore, it is useful to employ a system that can monitor (live, real-time) the executed planograms in the retail environment and can compare the executed planograms to a planned or modeled planogram, for instance, in a three-dimensional (3D) model. It is also useful for a system to monitor multiple planograms within a retail environment, such that the entire retail environment is monitored and compared to a 3D model of the retail environment that includes 3D models of multiple planograms. In this manner, the retail environment as a whole can conform with the planned 3D model of the retail environment by alerting the manager of the retail environment of nonconformities in the real-time, retail environment and issuing instructions to the manager to comply with the planned 3D model of the retail environment. Instructions can be detailed instructions, such as step-by-step instructions on how to correct the executed planograms. The system can generate instructions including corrections of the planograms. An employee can fix the planogram with correcting instructions faster than reconstructing the entire planogram from scratch.

Figure 1:
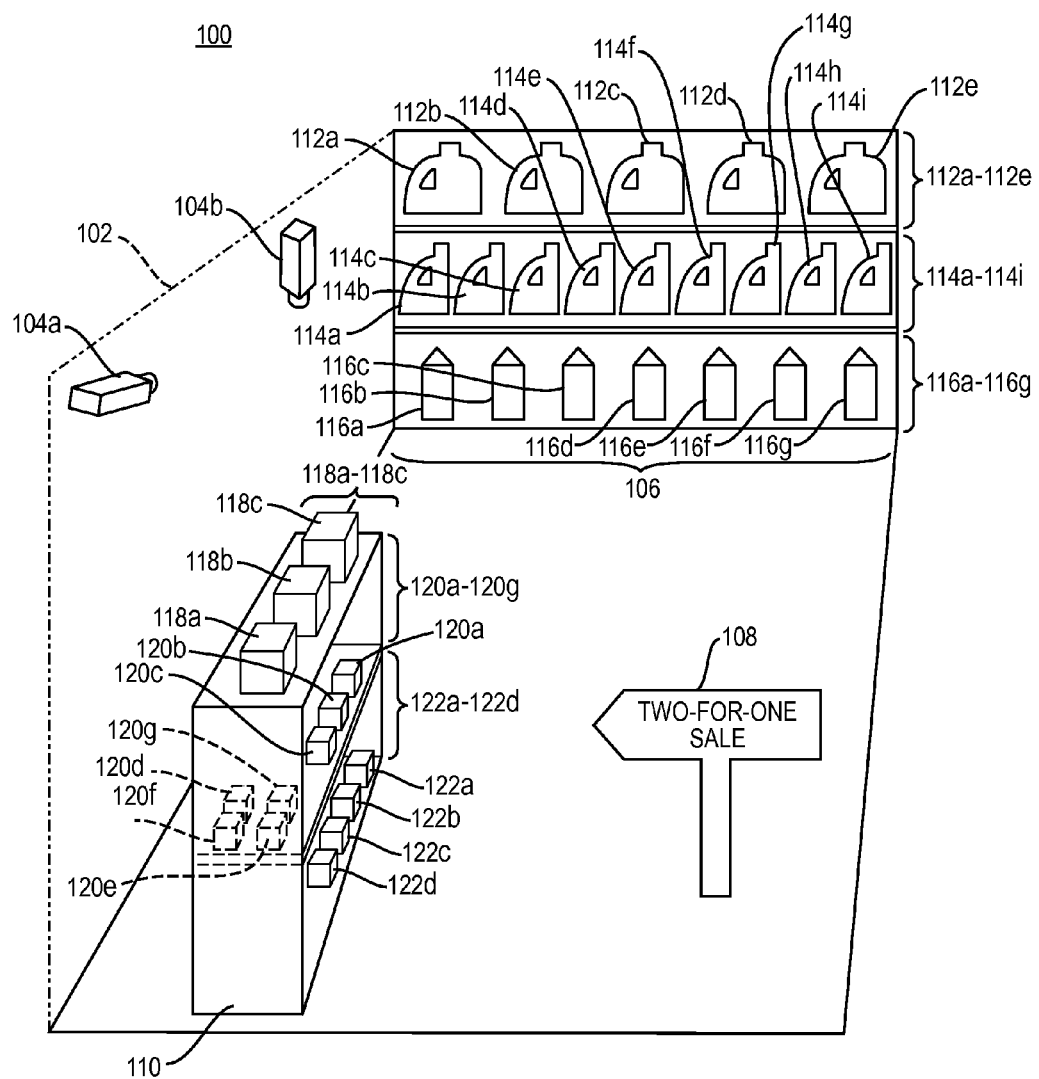
FIG. 1 is a schematic diagram of an example embodiment of a retail environment.

FIG. 1 is a diagram illustrating an example embodiment 100 in a retail environment 102. The retail environment 102 includes a first camera 104A and a second camera 104B. The first camera 104A and second camera 104B are both configured to retrieve live image data of the retail environment 102 for transmission to an environment analysis system 200 (such as 208 in FIGS. 2A-B, described below). The environment analysis system 200 analyzes the retail environment 102 based on the retrieved image data from the first camera 104A and the second camera 104B. A person of ordinary skill in the art can recognize that any number of cameras may be employed in the retail environment 102 to capture a subset of or the entire retail environment 102. A person of ordinary skill in the art can further recognize that each of the first camera 104A and the second camera 104B can also be employed as a security camera, where the first camera 104A and second camera 104B record images for the environment analysis system 200 periodically. In other words, the first camera 104A and second camera 104B may secondarily be used to send image data of the retail environment 102 to the environment analysis system 200. The system of security cameras is still fully operational for security purposes, because generally the environment analysis system 200 needs only a subset of the image data to analyze the full set of remaining frames can be recorded for the security system.

The retail environment 102 includes a first planogram space 106 and a second planogram space 110. The first planogram space 106 and the second planogram space 110 are each configured to present or display a plurality of products along three dimensions (vertical, horizontal and orthogonal). For example, the first planogram space 106 includes a first set of products 112A-E, a second set of products 114A-I, and a third set of products 116A-G. As described above, a designer of the retail environment 102 may desire that the first planogram space 106 have a particular configuration and arrangement of products 112A-E, 114A-I, and 116A-G. For instance, the second set of products 114A-I may be a product with high profit margins, and therefore placed across and along the middle shelf for higher consumer visibility. The environment analysis system 200 may detect that the second set of products 114A-I, however, are on a different shelf, for example the top shelf or the bottom shelf. The environment analysis system 200 then sends an alert to the manager of the retail environment 102, the designer of the planogram, or a manufacturer of the product to provide instructions of the correct configuration of the first planogram space 106 (i.e., correct arrangement of products 112A-E, 114A-I, and 116A-G).

The second planogram space 110 includes a fourth set of products 118A-C on a top shelf, a fifth set of products 120A-G on a middle shelf and a sixth set of products 122A-D on a bottom shelf. The retail principles described above in relation to the first planogram space 106 apply to the second planogram space 110. However, in addition to the types of feedback the environmental analysis system 200 provides as described above, the environmental analysis system 200 can also provide feedback on a location or orientation of the second planogram space 110. For example, presuming the second planogram space 110 is mobile (moveably positioned), the designer of the retail environment 102 may desire to locate the second planogram space 110 close to the entrance of the retail environment 102, close to another product within the retail environment 102, or in any other location in the retail environment 102.

A planogram promotion 108 can promote a product or set of products in a planogram 106, 110. Further the planogram promotion 108 may be moved, replaced, or redesigned as desired. The environment analysis system 200 can further analyze the execution of planogram promotions 108.

A person of ordinary skill in the art can also recognize that the retail environment 102 can include other data capture devices (not shown), such as an audio capture device such as a microphone. The audio capture devices (not shown) can capture voice, sound, or music. The environment analysis system 200 can further analyze the execution of an audio aspect of the planogram for conformity with a planned audio aspect of the planogram. In another embodiment, the environment analysis system 200 can further analyze the audio aspect of the planogram in a same analysis as the image analysis. The environment analysis system 200 can provide synergistic analytics and instructions by analyzing both image data and other acquired data, such as audio data, simultaneously. A person of ordinary skill in the art can further recognize that other data can be acquired and analyzed, such as olfactory data (e.g., smells or aromas to promote a particular perfume, cologne, or other product) or electromagnetic data (e.g., a wireless signal transmitted to customer's mobile devices), to determine conformity with a planned planogram.

Figure 2A:
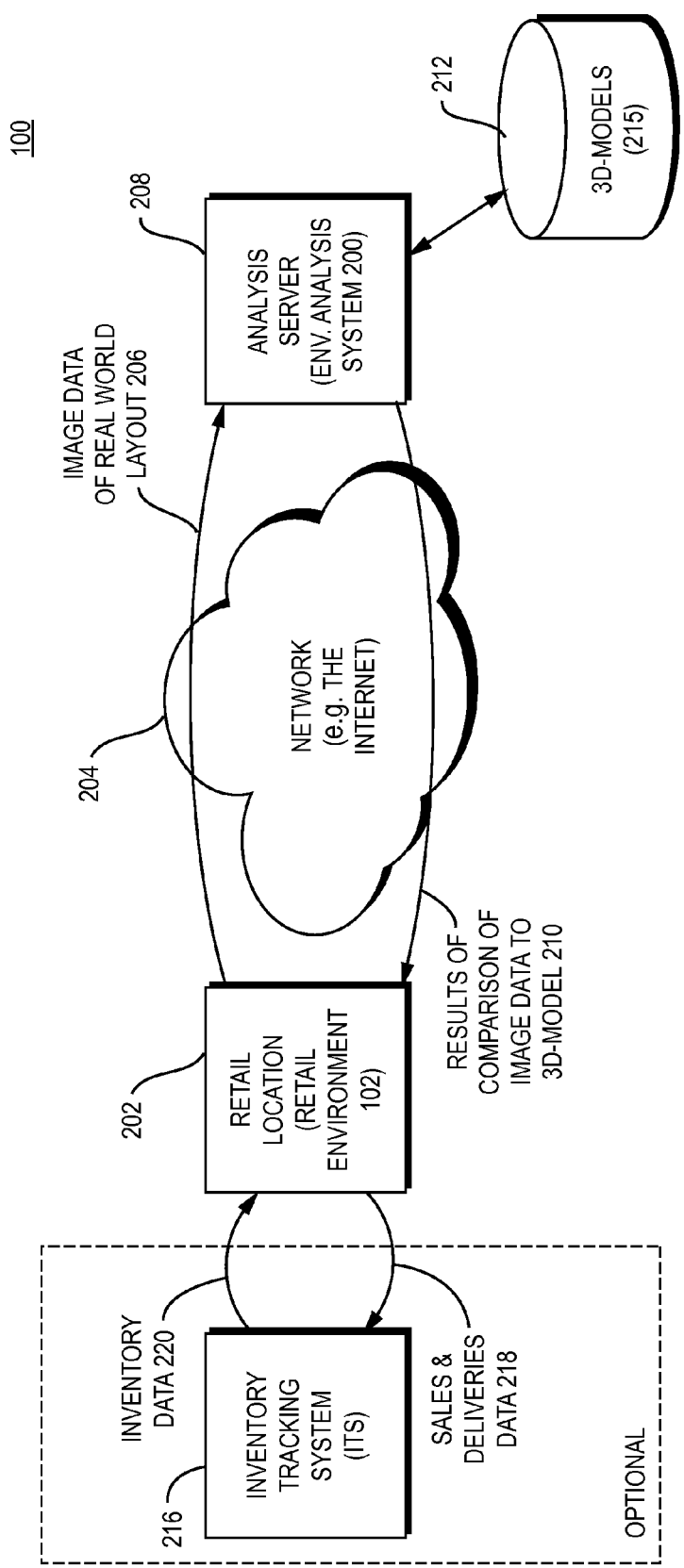
FIGS. 2A and 2B are block diagrams of communications between the retail location and an analysis server in the example embodiment of FIG. 1.

FIG. 2A is a block diagram of an example embodiment 100, communications between the retail location 202 (retail environment 102) and an analysis server 208 (environment analysis system 200) which implements or otherwise executes the environment analysis system 200. The retail location 202 transmits image data of the real world layout 206. Image data of the real-world layout 206 (along three-dimensions) can include multiple images taken from different cameras (such as 104A,B in FIG. 1) in the retail location 202. The image data 206 includes images of the layout of executed planograms and/or products, along three-dimensions, within the retail environment 102. The analysis server 208 receives the image data 206 and compares the image data 206 to a 3D model 215 of a planned layout of the retail environment 102. A memory area 212, such as a database or other storage device, is coupled to or otherwise accessible by analysis server 208 and stores 3D models 215 of planned layouts of various retail environments 102. The analysis server 208 then transmits results 210 of the comparison of the image data to the 3D model 215. The analysis server 208 transmits the results over a network 204, such as the Internet, to the retail location 202. The results 210 can include a list of differences between the image data 206 and the 3D model 215, or instructions to conform the placement (arrangement) of products within the retail environment 202 to the 3D model 215. Analysis server 208 may be remotely coupled to memory area 212 or may incorporate memory area 212 as a unitary system.

In one embodiment, optionally, the retail location 202 is configured to communicate with an inventory tracking system (ITS) 216, such as a transaction accounting system. The ITS 216 receives sales and deliveries data 218 from the retail location 202. The ITS 216, responsive to a request from the retail location 202 or a schedule, returns inventory data 220 to the retail location 202. As described herein, the environment analysis system 200 can compare inventory of the retail location 202 with the inventory data 220 returned from the inventory tracking system 216.

In another embodiment, the retail location 202 can receive the transmitted results 210 on any device capable of connection to the network 204. For example, the retail location 202 can receive the transmitted results 210 on a mobile device, cellular telephone, smart phone, tablet computer, personal computer, server, or any other client device.

Figure 2B:
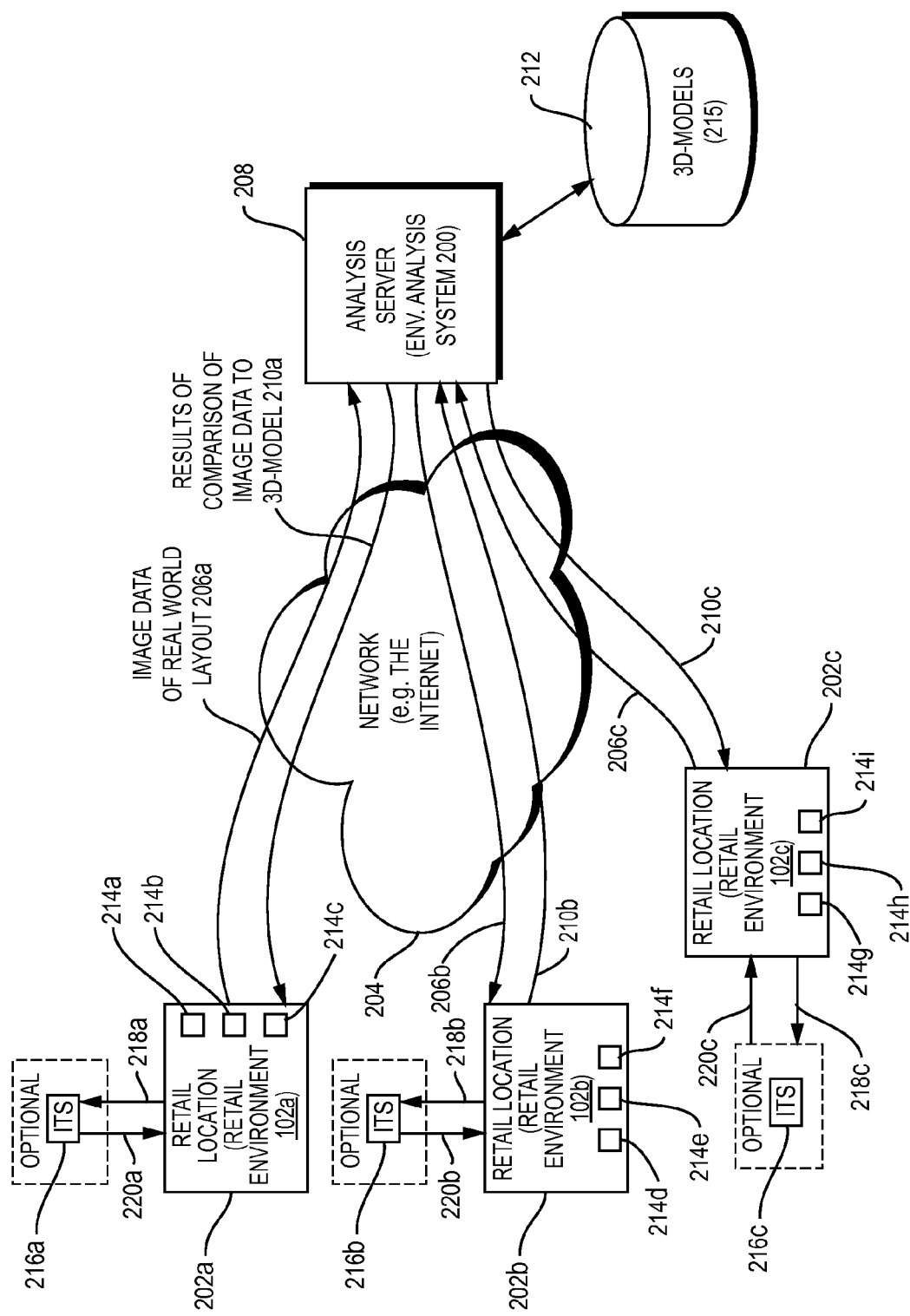

FIG. 2B is a block diagram illustrating an example embodiment 100, an analysis server 208, and a plurality of retail locations 202a-c (retail environments 102a-c). Each retail location 202a-c is configured to operatively communicate with the analysis server 208 by sending image data of the real world layout 206a-c and receiving results of the comparison of image data to the 3D model 210a-c, respectively. In this manner, the analysis server 208 can analyze any number of retail locations 102a-c against the 3D model. In another embodiment, the analysis server 208 can analyze the multiple retail locations 102a-c for similarities in the executed planograms in each respective retail environment 102a-c.

In addition, each retail location 202a can include multiple client devices 214a-i, respectively, configured to interface with the analysis server 208. The multiple client devices can be a mobile device, cellular telephone, smart phone, tablet computer, personal computer, server, or any other client device. The client devices 214a-i are configured to receive the results of the comparison of image data to the 3D model 210a-c, respectively, and display the results (e.g., in the form of instructions or an alert) to employees of the retail location 202a-c and respective retail environment 102a-c. In another embodiment, the client devices 214a-i can transmit image data of the real world layout 206a-c, or other data, to the analysis server 208 for additional analysis of the executed planograms.

In another optional embodiment, each retail location 202a-c is configured to operatively communicate with a respective ITS 216a-c. Each ITS 216a-c receives sales and delivery data 218a-c from a respective retail location 202a-c, and returns, responsive to a request from the retail location 202 or a schedule, inventory data 220a-c to the respective retail location 202a-c. As described herein, the environment analysis system 200 can compare inventory of the retail locations 202a-c with the inventory data 220a-c returned from the inventory tracking system 216a-c.

Figure 3:
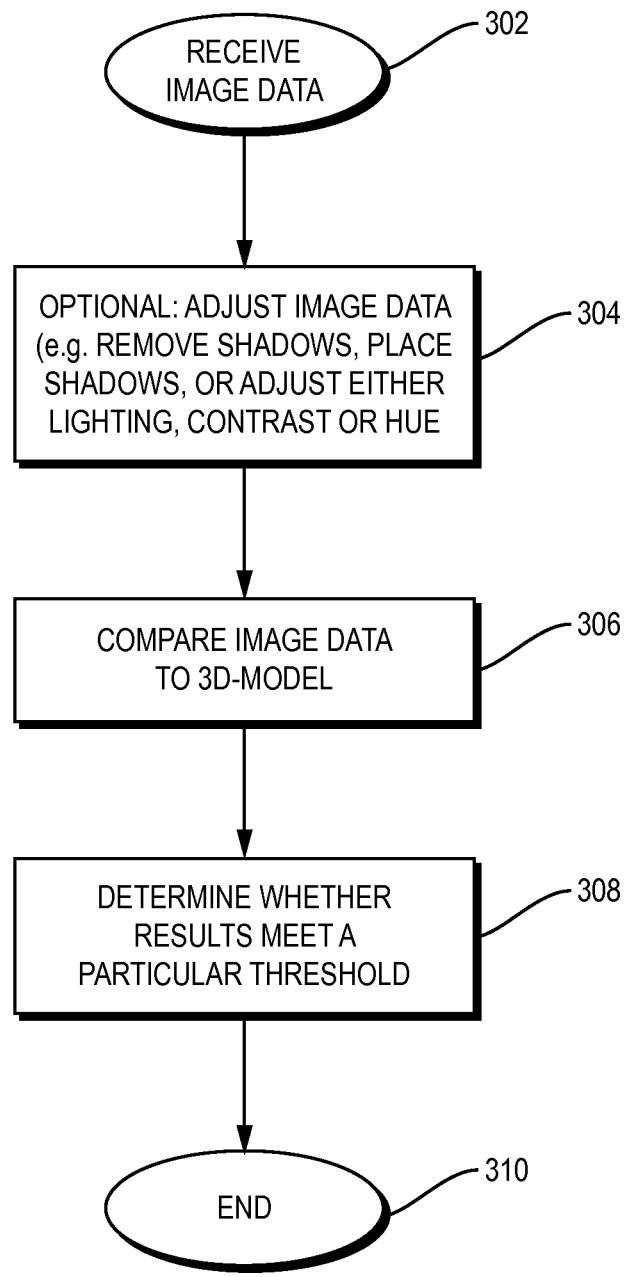
FIG. 3 is a flow diagram of the environment analysis system in the example embodiment of FIG. 1.

FIG. 3 is a flow diagram illustrating an example embodiment of the environment analysis system 200. The environment analysis system 200 (at step 302) first receives image data from the retail location 202. Optionally the environment analysis system 200 adjusts the image data at step 304, for example, by removing shadows from the image data, placing shadows into the image data, or adjusting lighting of the image data, contrast of objects in the image data, or hue of image data. Then, step 306 of the environment analysis system 200 compares the image data, as optionally modified (at 304), to a 3D model 215 (from memory area 212) of the planned retail environment 102. Then the environment analysis system 200 determines whether the comparison results meet a first particular threshold (at 308). Then, the method ends (310) by outputting an indication or performing an operation indicative of the threshold being met (such as outputting an alert, or the like).

Figure 4:
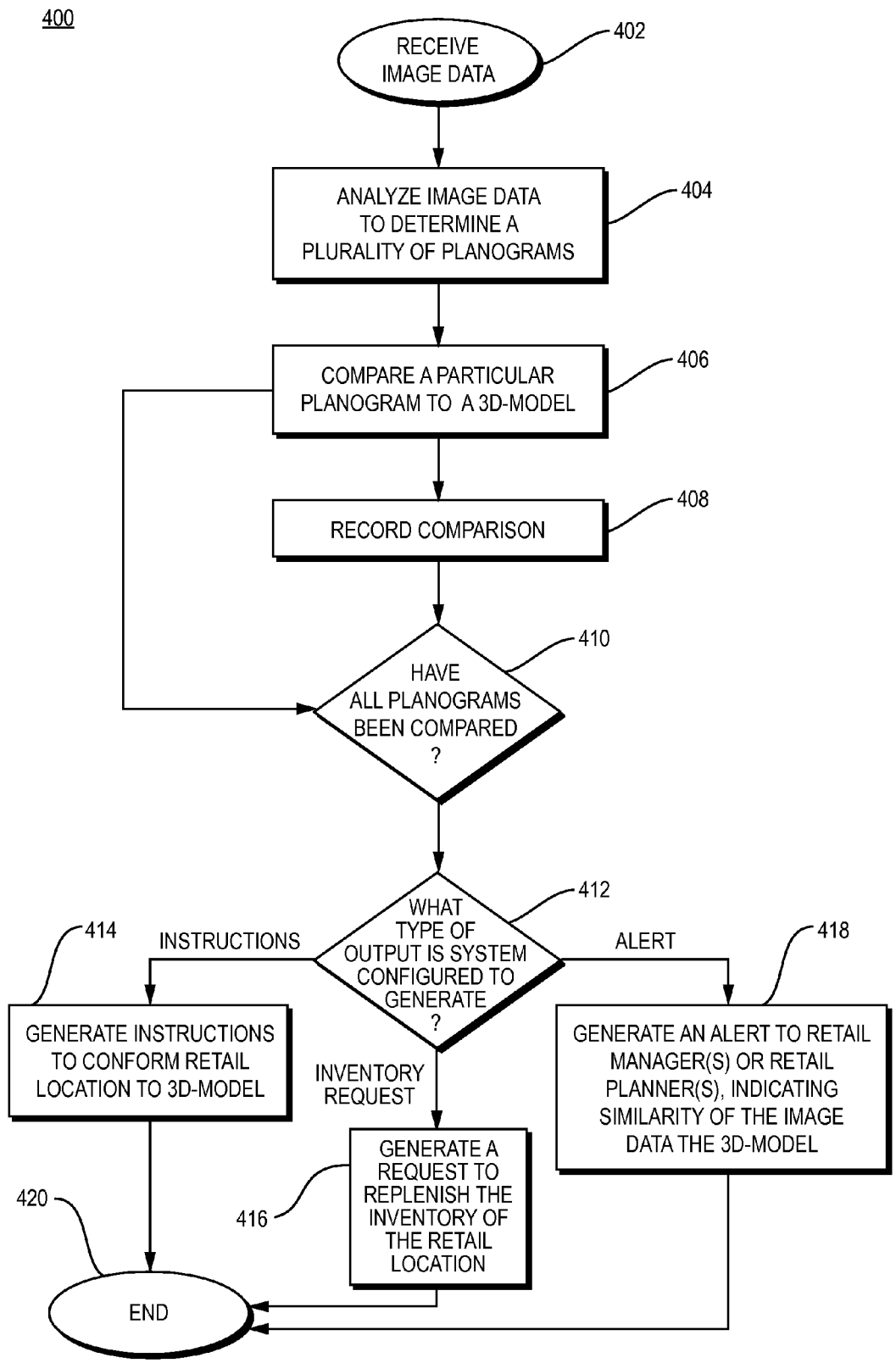
FIG. 4 is a flow diagram of another example embodiment of the environment analysis system.

FIG. 4 is a flow diagram illustrating another example embodiment process 400 of the environment analysis system 200. First, the environment analysis system 200 receives image data from a retail environment (402). The environment analysis system 200 then analyzes the image data to determine a plurality of planograms (404). For example, the retail environments 102 represented in the image data may have multiple planograms executed. The multiple executed planograms may have a particular arrangement relative to each other and relative to the retail environment 102 that requires analysis of all of the planograms together, not just as separate individual planograms. The environment analysis system 200 then compares a particular executed planogram to a planogram within the 3D model (406). In performing the comparison, not only is the particular executed planogram itself compared to the 3D model 215, but the location of the executed planogram within the retail environment 102 is also compared to the 3D model 215. For example, the environment analysis system 200 (step 406) can compare the executed planogram with its relative location to other planograms, walls, doors, windows, or other features of the retail environment 102.

The environment analysis system 200 then records the comparison (408). Next the environment analysis system 200 determines whether all the planograms (in the plurality detected at 404) have been compared (410). If the environment analysis system 200 has not compared all of the detected, executed planograms, the environment analysis system 200 compares another particular planogram to a pertinent 3D model 215 from the database 212. If the environment analysis system 200 has compared all of the detected, executed planograms, the environment analysis system 200 then determines the type of output the environment analysis system is configured to generate (412). If environment analysis system 200 is configured to output instructions, the environment analysis system 200 generates and outputs instructions (e.g., step-by-step instructions) to conform the retail location 202 to the 3D model (414).

Should the environment analysis system 200 be configured to generate an inventory request, the environment analysis system 200 generates and outputs a request to replenish the inventory of the retail location 202 based on the amount of inventory detected in the image data (416). Then the process of the environment analysis system ends (420).

Should the environment analysis system 200 be configured to generate an alert, the environment analysis system 200 generates and outputs an alert to one of the retail managers or retail planners indicating the similarities and differences of the camera image data to the 3D model 215. Then, the process 400 of the environment analysis system 200 ends (420).

A person of ordinary skill in the art can further recognize that the environment analysis system 200, instead of comparing a particular planogram to the 3D model 215 sequentially, can compare the entirety of the image data to the 3D model 215 concurrently. In this manner the environment analysis system 200 compares the entire retail environment 102 to the planned retail environment (as represented by 3D models 215), providing an analysis of an entire store model that can provide analytics of store dynamics.

Figure 5:
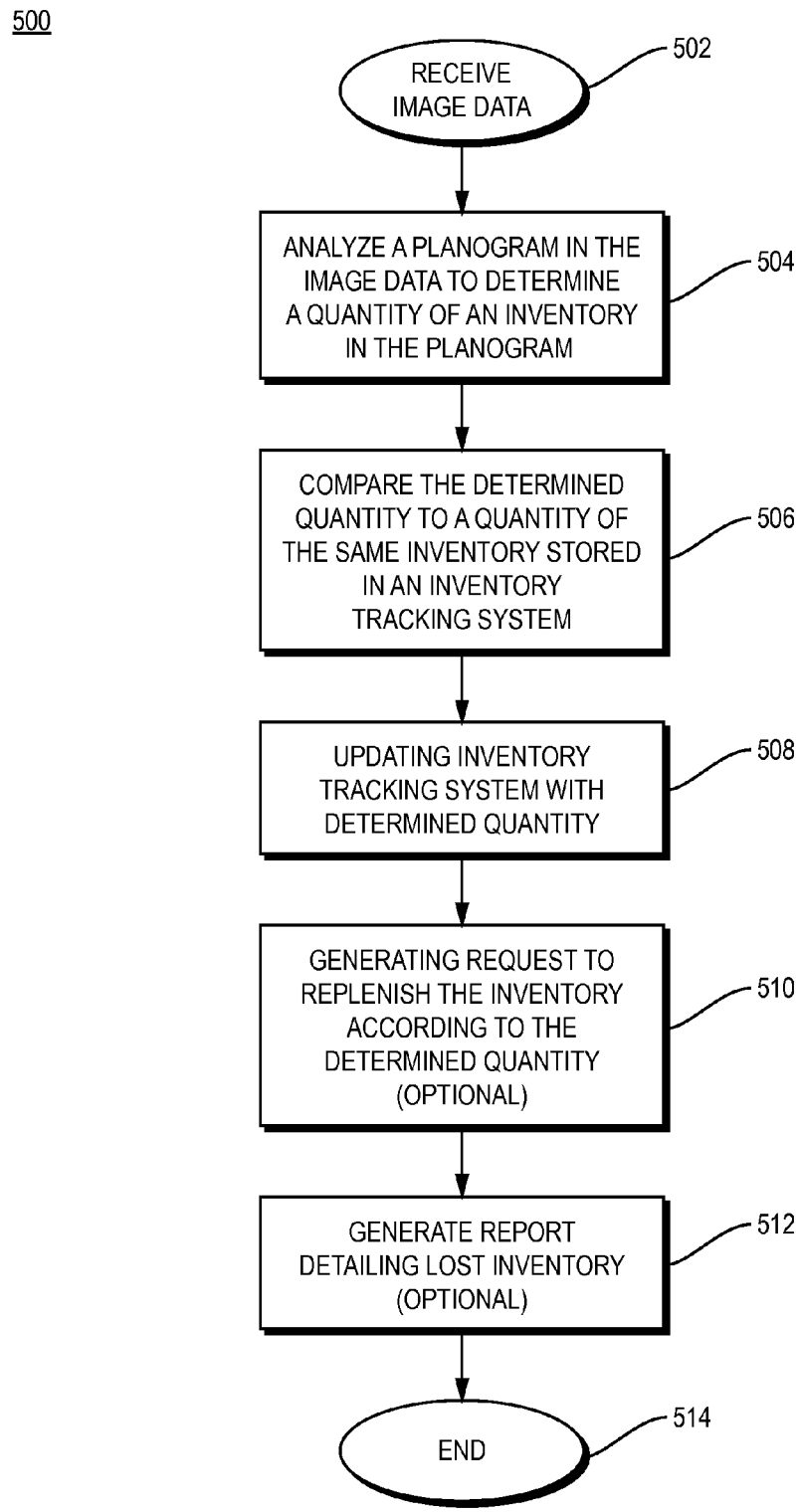
FIG. 5 is a flow diagram of another example embodiment of the environment analysis system.

FIG. 5 is a block diagram illustrating another example process 500 of the environment analysis system 200. The environment analysis system begins by receiving image data (502). The environment analysis system 200 then analyzes a planogram in the image data to determine a quantity of an inventory in the executed planogram (504). For example the environment analysis system 200 analyzes an executed planogram to determine a quantity of remaining products. A person of ordinary skill in the art can recognize that the environment analysis system 200 can analyze the entire store concurrently, in addition to each planogram sequentially. Next, the environment analysis system 200 compares the determined quantity (504) to a quantity of the same inventory indicated by an inventory tracking system 216, 216a-c, such as a transaction accounting system (506). Then, the environment analysis system 200 updates the inventory tracking system 216, 216a-c with the determined quantity (508). Then the environment analysis system 200 optionally generates a request to replenish the inventory according to the determined quantity (510). For example, should the quantity of inventory be below a particular threshold, the environment analysis system 200 automatically orders more inventory so that the retail location remains in stock of the required product (inventory). Next, the environment analysis system 200 also optionally generates a report detailing lost inventory (512). For example, the environment analysis system 200 can determine the difference between the amount of inventory on the shelves (and also in a back room or inventory room) on location and an amount of inventory indicated in the inventory tracking system 216, 216a-c. The environment analysis system 200 then outputs an indication of this determined difference as lost inventory, for example, stolen or otherwise missing inventory. Then the process of the environment analysis system 200 ends (514).

Figure 6:
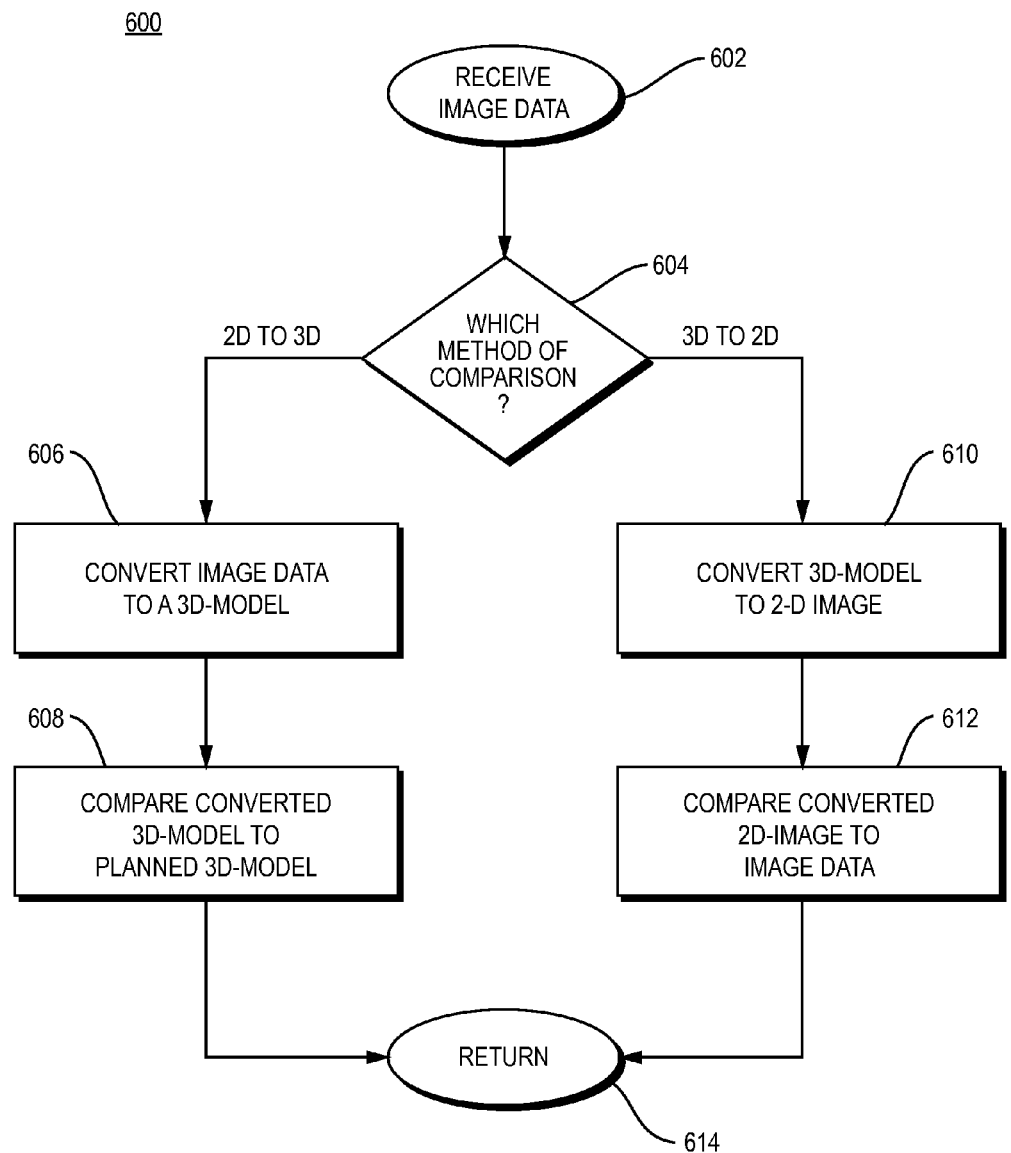
FIG. 6 is a flow diagram of an example embodiment of a process that compares image data to a 3D model in the environment analysis system.

FIG. 6 is a flow diagram illustrating an example embodiment of a process 600 that compares image data to a 3D model 215 in the environment analysis system 200. The environment analysis system 200 begins by receiving image data (602). The process 600 then determines which method of comparison the environment analysis system 200 employs (604). If the environment analysis system 200 employs a 2D to 3D conversion, then the process 600 converts the received image data (from 602) to a 3D model (606). The environment analysis system 200 and/or process 600 performs this conversion using common or known 2D to 3D data conversion methods. The environment analysis system 200 then compares the resulting 3D model to the planned 3D model 215 (as stored in database 212), because both are now in a same 3D format (608).

If the environment analysis system 200 uses a 3D to 2D method of comparison, the process 600 converts the 3D model 215 of the planned layout to a two-dimensional image (610). A person of ordinary skill in the art can recognize that the 2D image can also be multiple 2D images, or renderings, of the planned 3D model 215, particularly from the same vantage point(s) of the cameras 104A, B in the retail environment 102. Then, the environment analysis system 200 can compare the 2D images converted or rendered from the 3D model 215 to the received image data (612). Then the process 600 returns (614) the comparison results to pertinent next steps 306/308, 406/408, 504 of the environment analysis system 200.

The environment analysis system 200 can also be employed to analyze store dynamics. For example, image data can be transmitted periodically, even during hours when the store is open, to better understand how customer traffic and demand for products in the planograms evolves during a particular day, week, or month. Analytics can be provided to show inventory count over certain times (hours) of day(s), days of the week, times of the year, or particular shopping seasons, such as the end of the year holiday season. These analytics can be helpful to the planner of the planograms, so that he or she may design the planograms differently, or repeat a successful design using the analytics provided by the system. Analytics (e.g., know-how) can describe which sales or planogram methods are effective and ineffective. A designer of planograms values both knowledge of effectiveness and ineffectiveness. Further, designer awareness of planogram compliance and non-compliance with a planogram, as well as identifications of specific areas and/or reasons for non-compliance can help improve shopping experience for customers and business analytics, and therefore results, for store owners.

The method (process) and analyses of FIGS. 1-6 are computer-implemented. This means that the method is executed on at least one computer (such as server 208), or any system alike. Unless mentioned otherwise, all steps of the method are performed by the computer, i.e. without intervention of the user. For example, the steps of displaying (e.g., 414, 416, 418, 512), determining (e.g. 308, 404, 504), and comparing (e.g., 306, 406, and 506) may be performed by the computer, whereas the step of accessing the generated displayed comparisons is one example of a step where the user intervenes. Of course, although computer-implemented, the method as a whole may be itself performed upon an intervention of the user, e.g. for triggering the method.

The 3D models 215 of planned retail environment layouts/planogram product placements are created by use of a computer-aided design (CAD) system comprising a graphical user interface (GUI) suitable for this purpose. The CAD system comprises hardware and the GUI is coupled with a memory and a processor. The memory is any hardware suitable for the storage of information. Such a system is a tool with which the design of most CAD modeled objects is easy. Such a system may thus be used by a wide array of users, including specialist designers.

The information stored in the memory area 212 (i.e. three-dimensional parametric shape(s)) may be stored in the form of a database. By "database", it is meant any collection of data (i.e. information) organized for search and retrieval. When stored on a memory area 212, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users and applications (processes or processors) can rapidly search, rearrange, group, and select the field in many records to retrieve or create reports on particular aggregates of data according to the rules of the database management system being used.

The method and system used by the present invention is to create 3D models using 2D photographs, access previously CAD modeled objects (3D models 215), and/or create CAD models (3D models 215) for the objects. A CAD modeled object is any object defined by data stored in the memory. By extension, the expressions "modeled object" and "3D model" designate the data itself. According to the type of the system, the 3D models 215 may be defined by different kinds of data. A CAD system is any system suitable at least for designing a 3D model 215 on the basis of a graphical representation of the modeled planogram/planned layout, such as CATIA® (CATIA® is a registered trademark of Dassault Systems S.A., Velizy Villacoublay, France). Thus, the data defining a CAD modeled object comprise data allowing the representation of the modeled object (e.g. geometric data, for example including relative positions in space). A CAD system may for example provide a representation of CAD planogram/planned layout using edges or lines, in certain cases with faces or surfaces. Lines, edges, or surfaces may be represented in various manners, e.g. non-uniform rational B-splines (NURBS). Specifically, a CAD file may contain specifications, from which geometry may be generated, which in turn allows for a representation to be generated. Specifications of a 3D model 215 may be stored in a single CAD file or multiple ones. The typical size of a file representing a modeled object in a CAD system is in the range of one Megabyte per part, and a 3D model may typically be an assembly of thousands of parts.

The system may also be a computer-aided engineering (CAE) and/or computer-aided manufacturing (CAM) system, and the CAD modeled planogram may also be a CAE modeled object and/or a CAM modeled object. Indeed, CAD, CAE and CAM systems are not exclusive one of the other, as a 3D model 215 may be defined by data corresponding to any combination of these systems.

By "3D" with respect to the subject CAD models 215, it is meant any CAD object which is modeled by data allowing its 3D representation. A 3D representation allows the viewing of the represented object from all angles. For example, a 3D model 215, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

Figure 7:
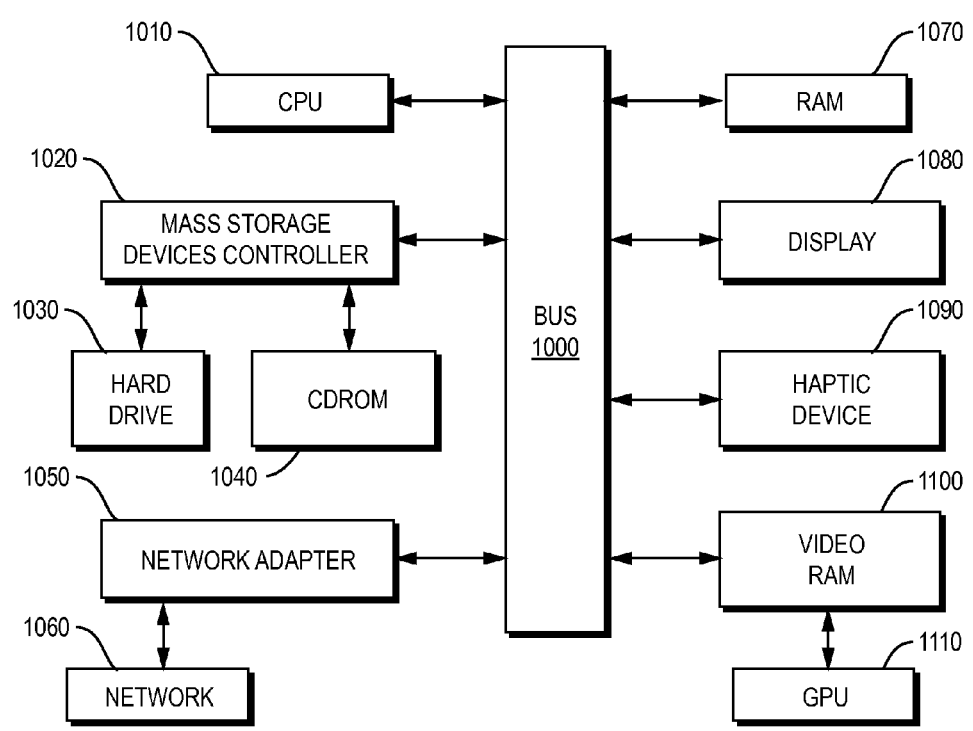
FIG. 7 is a block diagram of a computer system embodying the present invention.

FIG. 7 shows an example of the architecture of an exemplary computer, such as the server 208 and/or retail location 202 computer system. A single server may serve a plurality of retail locations. Further, a plurality of servers (e.g., a server farm) may serve a retail location or a plurality of retail locations. Some retail locations may vary their particular planograms to account for local market conditions, or architectures or layouts of the particular retail location.

Each of the server 208 and retail location 202 computers comprises a central processing unit (CPU) 1010 connected to an internal communication BUS 1000, a random access memory (RAM) 1070 also connected to the BUS 1000. The computer is further provided with a graphical processing unit (GPU) 1110 which is associated with a video random access memory 1100 connected to the BUS 1000. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060 (204 in FIGS. 2A-B). The retail location computer may also include a haptic device 1090 such as cursor control device, a keyboard or the like. The cursor control device allows the user to select various commands, and input control signals. System output (alerts, indications, corrective instructions and the like) is rendered through computer monitor 1080, display screen(s), speakers, and the like.

To cause the system to perform the method, a computer program is provided, including instructions for execution by a computer, the instructions comprising means for this purpose. The program may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The instructions may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-based method comprising:
   receiving image data of a real world layout at a computing device, the image data reflecting the real world layout across three dimensions, each of the three dimensions having an image range with a beginning and an end, and the real world layout having inventory distributed across the three dimensions;
   receiving audio data of the real world layout, the audio data reflecting at least one of sounds, voice, or music from the real world layout;
   comparing a 3D model of a planned layout of the real world layout to the received image data, the 3D model being from a tangible memory operatively coupled to the computing device and representing the planned layout across the three dimensions, wherein the comparing is able to convert the 3D model to a 2D representation and able to convert the received image data to a rendered 3D model;
   comparing a sound model of the planned layout of the environment to the received audio data, the sound model representing the planned layout; and
   determining, by the computing device, whether results of the comparison reach a first particular threshold and responsively indicating when the first particular threshold is reached.

2. The method of claim 1, further comprising:
   extracting, from the image data, at least one product display grouping;
   associating the extracted at least one product display grouping with at least one representation of the product display grouping in the 3D model of the planned layout;
   comparing the at least one product display groupings to the at least one representation of the product display grouping; and
   determining whether the results meet a second particular threshold.

3. The method of claim 1, further comprising:
   generating an alert if the results of the comparison of the 3D model to the received image data reaches the first particular threshold, wherein the comparison represents similarity or non-similarity and the first particular threshold represents a particular degree of similarity.

4. The method of claim 1, further comprising generating the 3D model of the planned layout.

5. The method of claim 1, wherein comparing the 3D model to the received image data includes calculating an image difference.

6. The method of claim 1, wherein comparing the 3D model to the received image data comprises comparing the 2D representation of the 3D model to the received image data.

7. The method of claim 1, wherein comparing the 3D model of the planned layout to the received image data comprises comparing the 3D model of the planned layout to the rendered 3D model.

8. The method of claim 1, wherein comparing a 3D model of a planned layout to the image data comprises:
   analyzing the image data to determine a first quantity in an inventory, the first quantity in the inventory represented in the real world layout;
   retrieving a second quantity in the inventory, the second quantity in the inventory represented in the 3D model of the planned layout; and
   comparing the first quantity and the second quantity.

9. The method of claim 8, wherein receiving image data comprises capturing image data of products in a customer display location and in a storage location.

10. The method of claim 8, wherein retrieving a second quantity in the inventory comprises retrieving the second quantity from a transaction accounting system.

11. The method of claim 8, wherein comparing the first quantity and the second quantity comprises calculating the difference of the first quantity and the second quantity, wherein the difference indicates a difference between a quantity of inventory calculated to be in a store and a quantity of inventory actually in the store.

12. The method of claim 1, wherein receiving the image data of a real world layout comprises capturing the image data of the real world layout with a plurality of cameras.

13. The method of claim 12, wherein receiving the image data of the real world layout comprises receiving the image data from the plurality of cameras positioned to be able to generate the 3D model of the real world layout.

14. The method of claim 1, further comprising:
   adjusting the received image data to match properties of the 3D model, wherein the properties include one or more of lighting characteristics, contrast, hue, shadow placement, and shadow removal.

15. The method of claim 1, further comprising:
   generating an instruction to conform the real world layout to the planned layout of the environment.

16. A system comprising:
   one or more processors, one or more computer-readable memories, one or more computer-readable tangible storage devices and program instructions which are stored on the one or more storage devices for execution by the one or more processors via the one or more memories, the program instructions, when loaded and executed by at least one of the one or more processors, cause the system to implement:
   a reception module configured to receive image data of a real world layout, the image data reflecting the real world layout across three dimensions, each of the three dimensions having an image range with a beginning and an end, and the real world layout having inventory distributed across the three dimensions;

the reception module further configured to receive audio data of the real world layout, the audio data reflecting at least one of sounds, voice, or music from the real world layout;

a comparison module configured to compare a 3D model of a planned layout of the real world layout to the received image data, the 3D model representing the planned layout across the three dimensions;

the comparison module further configured to compare a sound model of the planned layout of the environment to the received audio data, the sound model representing the planned layout;

a conversion module able to convert the 3D model to a 2D representation and able to convert the received image data to a rendered 3D model; and a threshold determination module configured to determine whether results of the comparison reach a first particular threshold, and to responsively indicate when the first particular threshold is reached.

17. The system of claim 16, further comprising:
program instructions, stored on at least one of the one or more storage devices for execution by at least one of the one or more processors via at least one of the one or more memories, to implement:
a grouping extraction module configured to extract, from the image data, at least one product display grouping; and
an association module configured to associate the extracted at least one product display grouping with at least one representation of the product display grouping in the 3D model of the planned layout, wherein the comparison module is further configured to compare the at least one product display groupings to at least one representation of the product display grouping, and the threshold determination module is further configured to determine whether the results meet a second particular threshold.

18. The system of claim 16, further comprising program instructions, stored on at least one of the one or more storage devices for execution by at least one of the one or more processors via at least one of the one or more memories, to implement an alert generation module configured to generate an alert if the comparison of the 3D model to the received image data reaches the first particular threshold, wherein the comparison represents similarity or non-similarity and the first particular threshold represents a particular degree of similarity.

19. The system of claim 16, further comprising program instructions, stored on at least one of the one or more storage devices for execution by at least one of the one or more processors via at least one of the one or more memories, to implement a model generation module configured to generate the 3D model of a planned layout.

20. The system of claim 16, wherein the comparison module is further configured to compare the 3D model to the received image data by calculating an image difference.

21. The system of claim 16 wherein the comparison module is further configured to compare the 2D representation of the 3D model to the received image data.

22. The system of claim 16 wherein the comparison module is further configured to compare the 3D model of the planned layout to the rendered 3D model.

23. The system of claim 16, wherein the comparison module comprises:
an analysis module configured to analyze the image data to determine a first quantity in an inventory; and
an inventory reception module configured to retrieve a second quantity in an inventory, and wherein the comparison module is further configured to compare the first quantity and the second quantity.

24. The system of claim 23, wherein the inventory reception module is further configured to receive image data of products in a customer display location and in a storage location.

25. The system of claim 23, wherein the inventory reception module is further configured to retrieve the second quantity of the products from a transaction accounting system.

26. The system of claim 23, wherein the comparison module is further configured to calculate the difference of the first and second inventories, wherein the difference indicates a difference between a quantity of inventory calculated to be in a store and a quantity of inventory actually in the store.

27. The system of claim 16, wherein the reception module is further configured to receive the image data of a real world layout from a plurality of cameras.

28. The system of claim 27, wherein the reception module is further configured to receive the image data from the plurality of cameras positioned to be able to generate a 3D model of the real world layout.

29. The system of claim 16, further comprising:
program instructions, stored on at least one of the one or more storage devices for execution by at least one of the one or more processors via at least one of the one or more memories, to implement:
an image adjustment module configured to adjust the image data to match properties of the 3D model, wherein the properties include one or more of lighting characteristics, contrast, hue, shadow placement, and shadow removal.

30. The system of claim 16, further comprising:
program instructions, stored on at least one of the one or more storage devices for execution by at least one of the one or more processors via at least one of the one or more memories, to implement:
an instruction generation module configured to generate an instruction to conform the real world layout to the planned layout of the environment.

31. A computer comprising:
a memory area configured to store image data reflecting a real world layout across three dimensions, each of the three dimensions having an image range with a beginning and an end, and the real world layout having inventory distributed across the three dimensions and a 3D model of a planned layout, the 3D model representing the planned layout across the three dimensions in said memory area; and
a processor coupled to said memory area, said processor configured to:
receive the image data of the real world layout;
receive audio data of the real world layout, the audio data reflecting at least one of sounds, voice, or music from the real world layout;
compare the 3D model of the planned layout to the received image data, wherein the comparing is able to convert the 3D model to a 2D representation and able to convert the image data to a rendered 3D model;
compare a sound model of the planned layout of the environment to the received audio data, the sound model representing the planned layout; and
determine whether results of the comparison reach a particular threshold and responsively indicate when the first particular threshold is reached.

32. A computer-based method comprising:
receiving multimedia data of a real world layout at a computing device, the multimedia data including audio data reflecting at least one of sounds, voice, or music from the real world layout and the multimedia data reflecting the real world layout across three dimensions, each of the three dimensions having an image range with a beginning and an end, and the real world layout having inventory distributed across the three dimensions;

comparing a 3D model of a planned layout of the real world layout to the received multimedia data, the 3D model, from a tangible memory operatively coupled to the computing device, representing the planned layout across the three dimensions;

comparing a sound model of the planned layout of the environment to the received multimedia data, the sound model representing the planned layout; and determining, by the computing device, whether results of the comparison reach a first particular threshold and responsively indicating when the first particular threshold has been reached.

\* \* \* \* \*